Patented Feb. 9, 1937

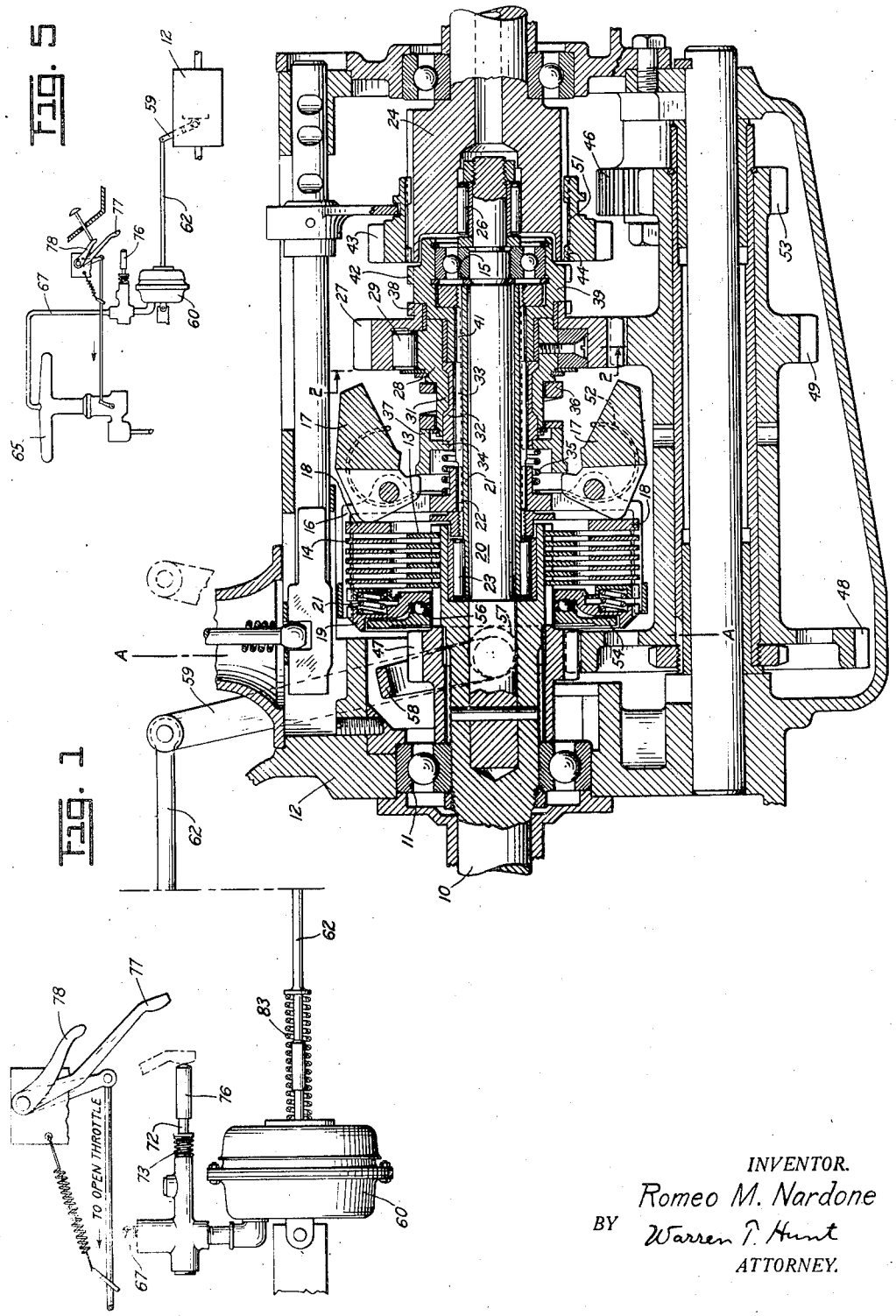

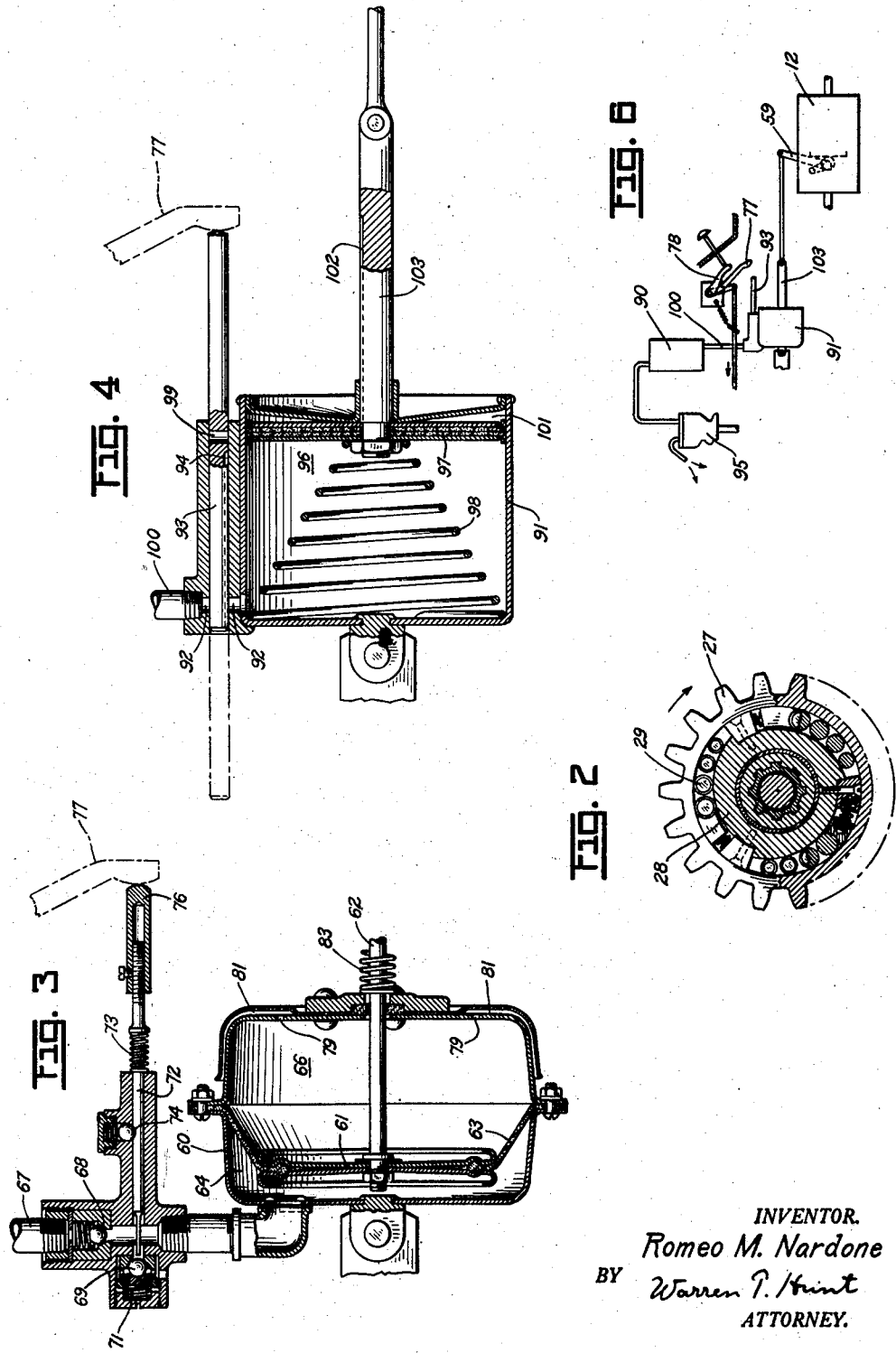

2,070,215

UNITED STATES PATENT OFFICE 2,070,215

AUTOMATIC TRANSMISSION

Romeo M. Nardone, East Orange, N. J., assignor to Eclipse Aviation Corporation, East Orange, N. J., a corporation of New Jersey Application December 6, 1933, Serial No. 701,196

18 Claims. (Cl. 74—472)

This invention relates to transmissions and more particularly to a variable speed automatic transmission such as is suitable for use in automotive vehicles.

Automatic transmissions of the speed or torque responsive types are open to objection under certain conditions because the gear changes are wholly out of control of the operator. It is one of the objects of the present invention to interconnect one of the engine speed controls with a control of the automatic transmission in order to vary the tendency to change the speed ratio at some predetermined position of the engine control. In throttle controlled engines the rate of increase in power approaches zero as the throttle approaches its wide open position, and the difference in power between the wide open position and a position slightly less than wide open, for example 5 degrees less than the wide open position, is scarcely noticeable. In the present invention the final movement of the throttle valve is utilized as a control for the automatic transmission whereby the gear changes to a certain extent are controlled by the vehicle operator.

Another object of the invention is to so interconnect the throttle control of the vehicle engine with the automatic transmission as to increase the tendency to asume a lower speed ratio at some predetermined throttle position, preferably the wide open throttle position.

Another object of the invention is to provide an automatic transmission with an engine manifold control which is operable at the will of the vehicle operator to vary the tendency to gear changes.

Another object of the invention is to provide an automatic variable speed transmission which is controlled by a vacuum device normally connected to the vehicle engine manifold, and in which a manual control of the transmission is effected by the admission of atmospheric air to the device.

Other objects and features of the transmission will be apparent from the following description in connection with which certain embodiments of the invention have been illustrated in the accompanying drawings, in which:

Fig. 1 is a vertical sectional view of the invention illustrating the interconnection of the transmission with the throttle control;

Fig. 2 is a sectional view of the second speed overrunning clutch taken along the lines 2—2 of Fig. 1;

Fig. 3 is a sectional view illustrating the vacuum device and the valve mechanism for selectively connecting the vacuum device with the engine manifold or the atmosphere;

Fig. 4 is a sectional view of a somewhat modified form of the vacuum device;

Fig. 5 is a diagrammatic arrangement of the relationship of the parts with respect to the engine; and Fig. 6 is a diagrammatic arrangement of the perts which are used with the form of the invention shown in Fig. 4.

The transmision in its general form, as herein disclosed, is similar to that disclosed in applicant's copending application, Serial No. 602,056, filed March 30, 1932, the principal difference being that in the present application means are included in the present application whereby the high speed clutch has its torque capacity varied by a device operated by manifold suction and controlled by a valve interconnected with the throttle valve of the vehicle engine.

Referring to the drawings, 10 is the driving shaft supported by bearing 11 in the transmission housing 12 and having splined thereto high speed clutch driving plates 13 which are interpositioned between the driven plates 14 having a splined connection with clutch housing 16. Plates 13 and 14 are adapted to be placed in a driving contact by centrifugal weights 17 acting through pressure plate 18 which forces the plates against the backing plate 19, preferably formed in two parts with a plurality of springs 21 interposed therebetween. Housing 16 is splined to the tubular driven shaft 21 at 22, the driven shaft being rotatably mounted in driving shaft 10 by bearing 23 and rotatably supported by bearing 15 in the drive shaft extension 20 which has its end supported in propeller shaft 24 by bearing 26. A second speed gear 27 is connected to its hub 28 by an overrunning clutch comprising rollers 29 which permit hub 28 to overrun the gear 27 in the direction of the arrows, as shown in Fig. 2 and to cause gear 27 to drive the hub when the rotation is in the same direction. Hub 28 is provided with threaded portions 31 coacting with similar threaded portions in nut 32 having a splined connection with the driven shaft 21 at 33. Nut 32 is adapted to be moved toward the left by torque reaction on gear 27 in a manner to cause sleeve 34 to overcome spring 35 and the centrifugal force of weights 17 to force them to their inner position. A spring 36 is mounted upon hub 28 and is held under compression by collar 37, the purpose of the spring being to lessen the centrifugal force of weights 17 after sleeve 34 has been forced toward the right a sufficient distance to bring it into contact with spring 36, whereafter spring 36 opposes further outward movement of the weights. Gear 27 is also provided with teeth 38 and is rotatably mounted with respect to member 39 having a splined connection with driven shaft 21 at 41 and having teeth 42 on its periphery. Gear 43 is slidably splined to propeller shaft 24 and is adapted to be moved either to the right or left from the position shown in the drawing to cause teeth 44 to engage with teeth 38 or teeth 42 or to cause the gear to mesh with reverse idler gear 46. In the initial movement of gear 43 toward the left, teeth 42 and 44 are intermeshed which position corresponds to the normal driving position wherein driving shaft 21 is directly connected to propeller shaft 24 through the disc clutch. Further movement of gear 43 toward the left causes teeth 44 to engage teeth 38 whereby the gear 27 is directly connected with propeller shaft 24 and the transmission is in the positive second speed position whereby the drive may be taken around the high speed clutch by means of gears 47, 48, 49, and 27. In this position of gear 43 teeth 42 are freely rotatable within gear 43 because of cut-out portion 51. Movement of gear 43 to its extreme position toward the right, as viewed in Fig. 1, causes gear 43 to mesh with idler gear 46 which in turn is meshed with gear 53, this position of sliding gear 43 corresponding to the reverse drive.

In the operation of the transmission as above described, and assuming that the high speed clutch is engaged by reason of weights 17 having been moved to their outer position by centrifugal force and springs 52, if the load on the propeller shaft 24 should increase to an extent whereby the high speed clutch capacity is insufficient to transmit the load, plates 13 and 14 will slip relatively to each other whereupon gear 27 will assume a portion of the load and cause nut 32 to move toward the left and depress weights 17 to completely release the clutch and permit gear 27 to assume the entire load. The transmission, as described so far, is similar in construction and operation to applicant's copending application, Serial No. 602,056, filed March 30, 1932, and it may be noted that the gear change from high speed to second speed is dependent on conditions which are outside of the control of the vehicle operator.

Under certain conditions it is desirable to have the transmission assume the second speed gear ratio at lower speeds or lower torque loads than would otherwise be possible, and to this end means have been incorporated in the transmission whereby the load capacity of the high speed clutch may be reduced. A control plate 54 is mounted on driving shaft 10 which is adapted to take the thrust of backing plate 19 through bearing 56. Control plate 54 is free on driving shaft 10 and is movable axially by means of an eccentric 57 bearing directly upon the pressure plate 54. Eccentric 57 is secured to yoke 58 rotatably mounted in housing 12 and having a lever 59 extending upwardly therefrom and interconnected with piston 61 by means of rod 62. Piston 61 is interconnected with the vacuum device housing 60 by flexible diaphragm 63 which divides housing 60 into two compartments 64 and 66. Compartment 64 is interconnected with the engine manifold 65 by means of a pipe 67 having a check valve 68 interposed between the manifold and the vacuum device. Means are provided for admitting atmospheric air into the compartment 64 which comprises a check valve 69 normally closed by a spring 71 and which is adapted to be opened by movement of rod 72. A spring 73 normally urges rod 72 toward the right, as viewed in Figs. 1 and 3 and it is preferably resiliently held in this position by detent 74. Rod 72 is provided at its outer end by an adjustable nut 76 which is adapted to be contacted by lever 77 interconnected with the vehicle throttle control pedal 78. Compartment 66 of the vacuum device is at all times in communication with the atmosphere through openings 79 and tortuous passage 81 which prevent the entrance of foreign particles into the device. Nut 76 is preferably so adjusted as to be out of contact with lever 77 except as the engine throttle approaches its open position whereupon further movement will move rod 72 toward the left, as viewed in Fig. 3, to unseat check valve 69 and permit atmospheric pressure to enter the chamber 64. Piston 61 is urged toward the right by spring 83 which spring is normally overcome by manifold suction within the chamber 64. Check valve 68 prevents flow of gases from the manifold to the chamber 64, therefore the pressure in chamber 64 during operation of the vehicle is normally of a value corresponding to the minimum pressure in the manifold, and under ordinary driving conditions piston 61 is moved toward the left to overcome spring 83 and is in the position shown in Figs. 1 and 3. During the operation of the vehicle the operator will ordinarily not depress throttle control lever 78 to its full extent, for it has been stated that the power of the engine is increased very slightly during the last movement of the throttle valve toward the wide open position and to all intents and purposes the power of the engine is a maximum regardless of slight variations in throttle from its wide open position. If the throttle be maintained at a position slightly less than the wide open position, the gear changes from high to second and second to high will be dependent on the speed of weights 17 and the load on propeller shaft 24, the point at which the gear changes will occur being dependent on these variables alone and not in any manner being under the control of the operator. If the operator should desire to change to a lower gear ratio, this may be obtained by movement of a throttle control lever 78 to the wide open position whereupon lever 77 will move rod 72 to open check valve 69 to admit atmospheric air to the chamber 64. As soon as pressure within chamber 64 has been reduced sufficiently, spring 83 will move piston 61 toward the right and cause lever and yoke 58 to be rotated in a clockwise direction and cause the high point of eccentric 57 to be moved in a manner to relieve pressure upon the control member 54. As soon as pressure is relieved upon the control member 54, the entire assembly of clutch plates 13 and 14 will move toward the left under the action of centrifugal weights 17, but it will be noted that outward movement of weights 17 is opposed by spring 36, therefore the pressure upon clutch plates 13 and 14 will be reduced and slippage will occur under conditions of either less torque or less speed than would normally occur.

In the form of the invention illustrated in Fig. 4 the cylinder 91 of the vacuum device is interconnected by a pipe 100 with a vacuum tank 90 through ports 92 which are normally closed by a rod 93 having a groove 94 formed therein which permits atmospheric air to enter the compartment 96. Tank 90 is evacuated by a pump 95 of any suitable design and preferably arranged to be engine driven. Under ordinary driving conditions piston 97 is pushed toward the right by spring 98. In connection with this form of the device, lever 59 should be placed in a reversed inclination with respect to the yoke 58, the eccentric 57 and the vertical line A—A, whereby when piston 97 is moved toward the left, eccentric 57 will be rotated in an anticlockwise direction to relieve the pressure upon control plate 54. In the operation of this form of the device, piston 97 is normally in the position shown in Fig. 4, but if it should be desired to vary the tendency of the transmission to change from the high to the low speed throttle, lever 78 is depressed to its full extent whereby port 99 aligns with pipe 100 and port 92, and manifold vacuum is communicated to the chamber 96 to cause piston 97 to move toward the left against the force of spring 98 to relieve the pressure upon clutch plates 13 and 14. It will be noted that compartment 101 on the right side of piston 97 is at all times in communication with the atmosphere by means of slot 102 formed in piston rod 103.

While two embodiments of the invention have been illustrated and described, it is to be understood that this showing and description are illustrative only and that the invention is not regarded as limited to the forms shown and described or otherwise, except by the terms of the following claims:

What is claimed is:

1. In an automatic variable speed transmission for a vehicle having an engine with an intake manifold and a throttle control, a driving shaft, a driven shaft, a clutch for connecting the shafts in a high speed ratio, means operable by manifold vacuum for varying the clutch capacity means for connecting the shafts around the clutch in a lower speed ratio, and mechanical means movable by the throttle control for controlling the manifold vacuum operable means to relieve the vacuum and vary the clutch capacity at a predetermined position of the throttle control.

2. In an automatic variable speed transmission for a vehicle having an engine with an intake manifold and a throttle control, a driving shaft, a driven shaft, a clutch for connecting the shafts in a high speed ratio, means for connecting the shafts around the clutch in a lower speed ratio, manifold pressure actuated means for controlling the clutch, and a valve movable by the throttle control for controlling the manifold pressure actuated means.

3. In an automatic variable speed transmission for a vehicle having an engine with an intake manifold and a throttle control, a driving shaft, a driven shaft, a clutch for connecting the shafts in a high speed ratio, means movable by manifold vacuum to increase the clutch capacity, means for connecting the shafts around the clutch in a lower speed ratio, and means movable by the throttle control for controlling the manifold vacuum movable means to relieve the vacuum and reduce the load capacity of the clutch at a predetermined throttle position.

4. In an automatic variable speed transmission for a vehicle having an engine, a driving shaft, a driven shaft, a clutch for connecting the shafts in a high speed ratio, means for connecting the shafts in a lower speed ratio, a manifold for the engine, a throttle in the manifold, fluid pressure actuated means for controlling the clutch, and means associated with the throttle for connecting the fluid pressure actuated means with the manifold at a predetermined throttle position.

5. In an automatic variable speed transmission for a vehicle having an engine, a driving shaft, a driven shaft, a clutch for connecting the shafts in a high speed ratio, means for connecting the shafts in a lower speed ratio, a manifold for the engine, a throttle in the manifold, fluid pressure actuated means for controlling the clutch, and means associated with the throttle for connecting the fluid pressure actuated means to the manifold between the throttle and the engine at a predetermined throttle position.

6. In an automatic variable speed transmission for a vehicle having an engine, a driving shaft, a driven shaft, a clutch for connecting the shafts in a high speed ratio, means for connecting the shafts in a lower speed ratio, a manifold for the engine, a throttle in the manifold, manifold pressure actuated means for controlling the clutch, mechanical means movable by the throttle control to control the manifold pressure means, and said pressure actuated means being operative to reduce the capacity of the clutch.

7. In an automatic variable speed transmission for a vehicle having an engine power control, a driving shaft, a driven shaft, a friction clutch for connecting the shafts in a high speed ratio, means for connecting the shafts around the clutch in a lower speed ratio, and fluid pressure actuated means associated with the power control for varying the load capacity of the friction clutch at a predetermined power control position, said fluid pressure actuated means being arranged to decrease the capacity of the clutch when the power control is positioned to increase the engine power.

8. In an automatic variable speed transmission for a vehicle having an engine with a throttle control a driving shaft, a driven shaft, a centrifugal clutch for connecting the shafts in a high speed ratio, gear means including an overrunning clutch for connecting the shafts around the clutch in a lower speed ratio, a normally inactive device for varying the torque capacity of the centrifugal clutch, and an actuating member for controlling the operation of the device, said actuating member being arranged in the path of the throttle control to be actuated thereby to reduce the torque capacity of the centrifugal clutch after a predetermined opening movement of the throttle control.

9. In an automatic variable speed transmission for a vehicle having an engine with a throttle control, a driving shaft, a driven shaft, a centrifugal clutch for connecting the shafts in a high speed ratio, gear means including an overrunning clutch for connecting the shafts around the clutch in a lower speed ratio, a normally inactive power operated device for varying the torque capacity of the centrifugal clutch, means for supplying power to the device, and a control member for the power supplying means located in the path of the throttle control to be moved thereby to an operative position after a predetermined movement of the throttle control.

10. In an automatic variable speed transmission for a vehicle having an engine with a throttle control, a centrifugal clutch for connecting the shafts in a high speed ratio, gear means including an overrunning clutch for connecting the shafts around the clutch in a lower speed ratio, means associated with the throttle control for varying the capacity of the centrifugal clutch at a predetermined position of the throttle control, and torque responsive means associated with the lower speed gear means for controlling the clutch, said throttle control means being arranged to decrease the clutch capacity when the throttle is opened and said torque responsive means being arranged to disengage the clutch at a predetermined load on the lower gear ratio connecting means.

11. In an automatic variable speed transmission for an engine having a throttle control, a friction clutch for connecting the shafts in a high speed ratio, means including an overrunning clutch for connecting the shafts around the clutch in a lower speed ratio, centrifugal weights for controlling the clutch, a backing plate for the clutch, means for limiting the outward movement of the weights, and means operated by the throttle control, after a predetermined movement thereof, for moving the backing plate with reference to the clutch at a predetermined throttle position.

12. In an automatic variable speed transmission for an engine having a throttle control, a friction clutch for connecting the shafts in a high speed ratio, means including an overrunning clutch for connecting the shafts around the clutch in a lower speed ratio, centrifugal weights for controlling the clutch, a backing plate for the clutch, means for limiting the outward movement of the weights, means associated with the throttle control for moving the backing plate with reference to the clutch at a predetermined throttle position, and said throttle means being arranged to move the backing plate away from the weights when the throttle is opened.

13. In an automatic variable speed transmission for an engine having a throttle control, a friction clutch for connecting the shafts in a high speed ratio, means including an overrunning clutch for connecting the shafts around the clutch in a lower speed ratio, centrifugal weights for controlling the clutch, a backing plate for the clutch, means for limiting the outward movement of the weights, means operated by the throttle control after a predetermined movement thereof for moving the backing plate with reference to the clutch at a predetermined throttle position, and torque responsive means associated with said lower speed gear means for controlling the weights.

14. In an automatic variable speed transmission for an engine having a throttle control, a friction clutch for connecting the shafts in a high speed ratio, means including an overrunning clutch for connecting the shafts around the clutch in a lower speed ratio, centrifugal weights for controlling the clutch, a backing plate for the clutch, means for limiting the outward movement of the weights, means associated with the throttle control for moving the backing plate with reference to the clutch at a predetermined throttle position, torque responsive means associated with the lower speed connecting means for depressing the weights at a predetermined load, and said throttle control means being arranged to move the backing plate away from the weights when the throttle is opened.

15. In a variable speed transmission for a vehicle having an engine with a manifold, a mechanism for influencing gear ratio changes including a vacuum device communicating with the manifold, means for blocking the communication when the pressure within the device is lower than the manifold, manually operable means for admitting atmospheric air to the device, and said device being operable to influence a gear ratio change upon the admission of atmospheric air.

16. In a variable speed transmission for a vehicle having an engine with a manifold and a throttle, a driving shaft, a driven shaft, a clutch for connecting the shafts, other means for connecting the shafts, a cylinder connected to the intake manifold above the throttle, a check valve between the manifold and cylinder, a piston in the cylinder for controlling the clutch, an atmospheric valve in the cylinder, and means associated with the throttle for opening the atmospheric valve when the throttle is opened a predetermined amount.

17. In an automatic variable speed transmission for a vehicle having an engine, a driving shaft, a driven shaft, a friction clutch for connecting the shafts in a high speed ratio, means for connecting the shafts in a lower speed ratio, a power control for the engine, a servo-motor, and means actuated by the power control for causing the servo-motor to decrease the capacity of the clutch at a predetermined power control position.

18. In an automatic variable speed transmission for a vehicle having an engine, a driving shaft, a driven shaft, a friction clutch for connecting the shafts in a high speed ratio, means for connecting the shafts in a lower speed ratio, a power control for the engine, a servo-motor, and means actuated by the power control for causing the servo-motor to decrease the capacity of the clutch when the power control is positioned to increase the engine power.

ROMEO M. NARDONE.